Oct. 22, 1968      M. B. STULL      3,406,880
DISPENSING CLOSURE CAP
Filed Dec. 29, 1966      2 Sheets-Sheet 1
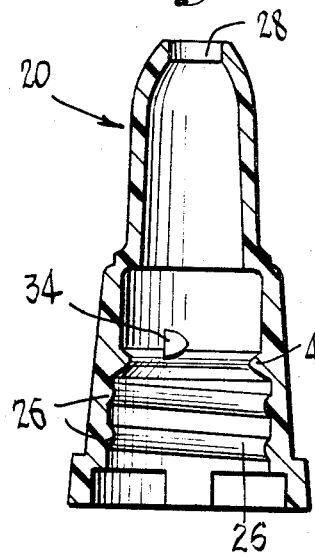
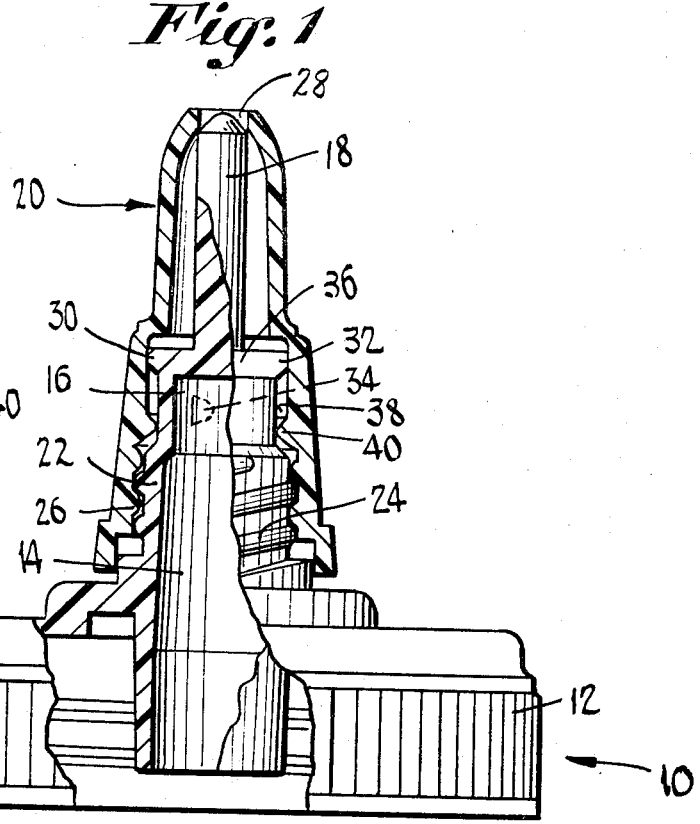
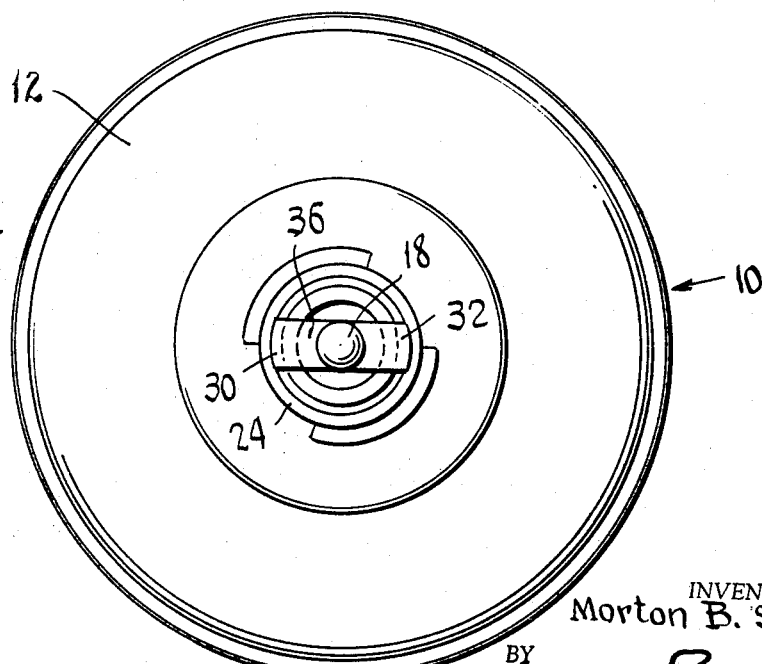
INVENTOR.
Morton B. Stull
BY
*H. Gilman Lehmann*
AGENT Oct. 22, 1968  M. B. STULL  3,406,880
DISPENSING CLOSURE CAP Filed Dec. 29, 1966  2 Sheets-Sheet 2

INVENTOR.
Morton B. Stull
BY
H. Gibner Lehmann
AGENT

United States Patent Office 3,406,880
Patented Oct. 22, 1968

3,406,880
DISPENSING CLOSURE CAP
Morton B. Stull, Boonton, N.J. (% Stull Engraving Company, 221–223 Banta Ave., Garfield, N.J. 07026)
Filed Dec. 29, 1966, Ser. No. 605,805
10 Claims. (Cl. 222—521)

ABSTRACT OF THE DISCLOSURE

A dispensing closure cap structure having a tubular molded plastic, yieldable body through which the product passes, and having a screw cap on the body, provided with a central orifice which is closed by a closure pin on the body when the cap is screwed down. The tubular body at its upper end has at least one stop lug engageable with a cooperable lug in the screw cap, and the body has reinforcement means in its discharge passage, tending to stiffen and back-up the stop lug thereof, said reinforcement means carrying the closure pin.

Cross references (1) U.S. application Ser. No. 511,593, filed Dec. 6, 1965, now Patent No. 3,319,843 by Morton B. Stull, and entitled, "Captive Closure Cap Construction."

(3) Copending application of Morton B. Stull, Ser. No. 602,004, filed Dec. 15, 1966, and entitled, "Dispensing Closure Cap."

(4) Copending application of Morton B. Stull, Ser. No. 605,654, filed Dec. 29, 1966 now Patent No. 3,370,764 and entitled, "Dispensing Screw-Type Closure Cap."

(5) Copending application of Morton B. Stull, Ser. No. 549,323, filed May 11, 1966, now Patent No. 3,339,773 and entitled, "Screw Closure."

(6) Copending application of Morton B. Stull, Ser. No. 573,717, filed Aug. 19, 1966, now Patent No. 3,351,249 and entitled, "Captive Dispensing Closure for Containers."

Background

This invention relates to molded plastic dispensing closure caps wherein a stationary body portion holds captive a movable screw cap portion which has the discharge orifice.

In some prior caps of the type indicated, stops are provided on the base of the tubular body member to limit the unscrewing movement of the screw cap. Under certain circumstances this arrangement of stops might not be desirable.

Summary

The present invention improves the desirability of stops intended to limit the upward or unscrewing movement of the screw cap, and objects of the invention include a novel and improved dispensing type captive closure cap construction of molded plastic parts, wherein reliable interiorly disposed stop means are provided at the upper end of the tubular body member, to limit the upward or unscrewing movement of the screw cap. This is accomplished by the provision of cooperable stop lugs in the screw cap and on the tubular body, which become effective as the screw cap is unscrewed, and by reinforcement means on the yieldable tubular body, tending to stiffen and back up the stop lugs thereof.

Other objects and advantages are to provide an improved cap construction as above, wherein the upper limit stop is especially effective and failure-resistant, wherein reliable and novel seals are provided in conjunction with the stops, wherein different amounts of travel of the cap can be had, wherein a fast screw lead or a slow screw lead may be utilized, wherein positive means are provided to insure upward axial movement of the cap in response to its being turned, wherein simple, easily molded low-cost plastic parts are possible, wherein there is reliable and simple operation, small size and compactness.

Other features and advantages will hereinafter appear.

In the drawings:

FIG. 1 is a view partly in axial section and partly in side elevation, of a cap construction made in accordance with the invention, the screw cap part being started toward the open position.

FIG. 2 is a view partly in axial section and partly in side elevation, of the screw cap part of the cap construction.

FIG. 3 is a top plan view of the body part of the screw cap construction.

Figure 4:
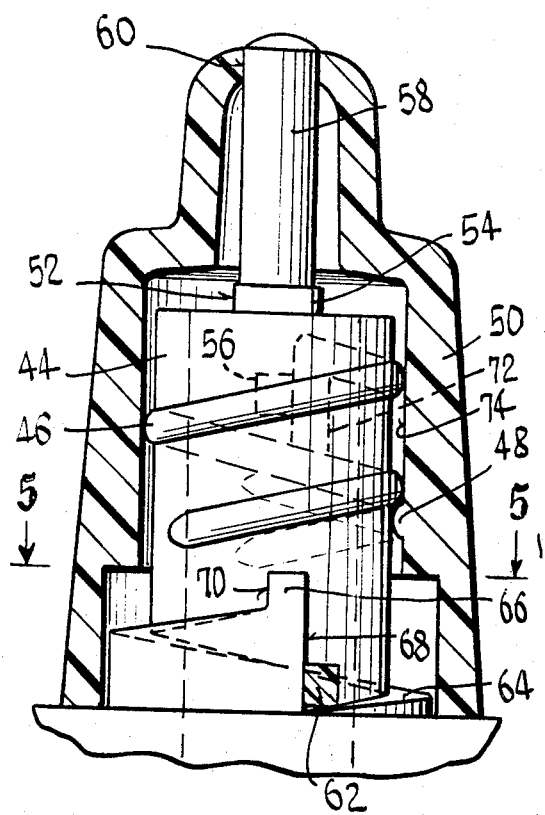
FIG. 4 is an axial section-side elevational view of a cap construction illustrating another embodiment of the invention.

Referring first to FIGS. 1–3, the cap construction as illustrated therein comprises a tubular body part indicated generally by the numeral 10, having an internally threaded base portion 12 arranged to be either screwed onto the neck of a container or to be press-fitted thereon in accordance with well known procedures. The body part 10 has a central bore or discharge passage 14 through which the liquid product passes. At its upper end 16 the tubular body part 10 has a closure pin 18 which is disposed at the end of the discharge passage 14, and which extends upward from the center of the end 16.

Carried by the tubular body part 10 is a molded plastic screw cap 20 which is axially movable on said body and which surrounds the upstanding or nozzle portion 22 of the body.

The tubular body 10, 22 and the screw cap 20 have cooperable thread means comprising an external screw thread 24 on the portion 22 and an internal screw thread 26 in the lower portion of the cap 20. Preferably the cooperable threads 24, 26 are double threads, that is, they comprise two separate thread elements for the cap, and two separate thread elements for the tubular body. By such arrangement a faster lead is had, whereby the entire turning movement for shifting the screw cap from the lower, closed position to the raised, opened position involves a turning of slightly less than 180°. However, it will be understood that a slower screw pitch may be utilized, to provide for a turning movement of slightly less than 360° to effect the opening-to-closing movement of the screw cap and vice versa.

The screw cap 20 has a discharge orifice 28 in its top, which is adapted to be closed by the pin 18 of the body 10 when the cap is screwed down on the body.

In accordance with the present invention the upper end of the tubular body 10, or more specifically the discharge or spout portion 22 thereof, is provided with at least one stop lug and preferably two such lugs, spaced apart 180°. As seen in FIG. 3, the stop lugs are designated respectively 30, 32. The lugs 30, 32 are seen to be disposed on the outer surface of the upper end 16 of the tubular body 10, 22. Also, the screw cap 20 is provided with one or several cooperable stop lugs as the case may be, indicated by the numeral 34. The lugs 34 are located on the inside of the screw cap 20, and are respectively engageable with the lugs 30, 32 of the tubular body when the screw cap is raised, thereby to limit the unscrewing turning movement of the cap. Further, reinforcement means for the upper end 16 of the tubular body portion 22 are provided, said means being especially provided to stiffen or strengthen the action of the stop lugs 30, 32 thereof. The said reinforcement means comprises a rib 36 which extends transversely across the discharge passage 14 of the tubular body, being diametrically disposed and being formed at its ends to constitute the stop lugs 30, 32. The rib 36 may be thought of as being joined to the inside or top edge of the tubular body 22 at points adjoining the stop lugs 30, 32 thereof.

Additionally, the closure pin 18 is mounted on the diametric rib 36, the latter constituting a convenient and effective means for supporting the closure in the desired centralized position.

Disposed below the stop lugs 30, 32 and above the thread means 24, the tubular body 22 has an outer cylindrical sealing surface 38 which is engageable by an internal annular rib 40 of the screw cap for all of the various open and closed positions of the latter. Accordingly, the liquid product is prevented by the sealing bead 40 from reaching and contaminating the screw threads 24, 26 as will be understood.

It will be noted that the stop lugs 30, 32 do not project radially beyond the sealing surface 38 to any great extent. However, a large projection beyond the surface 38 is not required if means are provided to prevent the stop lugs 30, 32 from yielding to any appreciable extent when being subjected to stress as the screw cap is unscrewed or turned upward. In reinforcing the stop lugs 30, 32, the diametric rib 36 provides this necessary reliability of action whereby the lugs are effective in restraining the unscrewing movement of the screw cap even though they do not project radially to any appreciable extent.

As seen in FIG. 3, the diametric rib 36 extends between the lugs 30, 32 and in fact comprises essentially a body portion or joining means whereby the lugs are positively prevented from being shifted radially inward at all times. Accordingly, the lugs function as positive stops, in cooperation with the internal stop lugs 34 of the screw cap 20.

Figure 5:
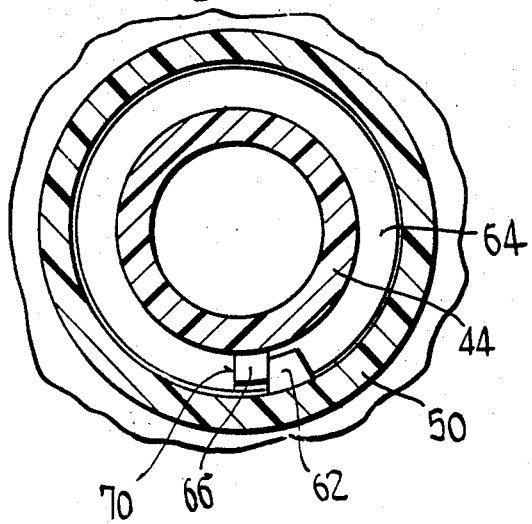
FIG. 5 is a horizontal section on line 5—5 of FIG. 4.

Another embodiment of the invention is illustrated in FIGS. 4 and 5, wherein but single separate stop lugs are provided on the tubular body, permitting a rotative movement of slightly less than 360° as contrasted with the 180° movement of the embodiment of FIGS. 1–3.

Also, the embodiment of FIGS. 4 and 5 utilizes the screw threads means itself as the sealing device which prevents contamination of said thread means and also of lowermost portions of the tubular body and screw cap.

As shown, the cap construction comprises a tubular body 44 having on its outer surface a single helical thread element 46 which is cooperable with an internal thread element 48 on the inside of the screw cap 50.

The tubular body 44 has a transverse rib or bridge 52 at one end of which (the far or back end as viewed in FIG. 4) there is a stop lug 54 which is cooperable with an internal stop lug 56 disposed on the inside of the screw cap 50.

The bridge 52 mounts a closure pin 58 which constitutes a stopper for the orifice 60 in the top of the screw cap 50, and the latter has a second internal stop lug 62 adapted to ride on a helical track 64 provided at the exterior of the base of the tubular member 44. The base of this member also has a stop lug 66 having surfaces 68 and 70 which are engageable with opposite surfaces of the lug 62 for the lowered and raised positions of the screw cap 50. By such arrangement a total turning movement of slightly less than 360° is possible for the screw cap 50.

In accordance with the invention, the tubular body 44 has a vertical bead 72 which also engages the cylindrical inside surface 74 of the screw cap along with the screw thread 46. The vertical bead 72 connects adjoining convolutions of the screw thread 46, and by virtue of such bead and screw thread sealingly engaging the cylindrical surface 74 of the screw cap the liquid product is prevented from getting between the convolutions of the screw threads, or from flowing downward to engage the lower portions of the screw cap or tubular body.

It will be noted that double stops are provided for both the raised position of the screw cap 50 when the latter is unscrewed, and the lowered position of the cap. For the raised position, the interior stop lug 56 of the cap will engage the stop lug 54 at the far end of the bridge 52 (as viewed in FIG. 4) of the tubular body. For the lowered cap position, the lug 56 will engage the vertical bead 72 of the body 44. For the raised cap position, the interior stop lug 62 of the cap will engage the surface 70 of the stop lug 66 of the tubular body. Thus, there is provided double insurance against stripping of the screw cap past the stop lugs.

It will be noted that the stop lug 54, being constituted as one end of the bridge or rib 52, is reinforced thereby and prevented from having any inward radial movement whatsoever. Accordingly, a reliable stop or limiting action is had as a consequence.

Figure 6:
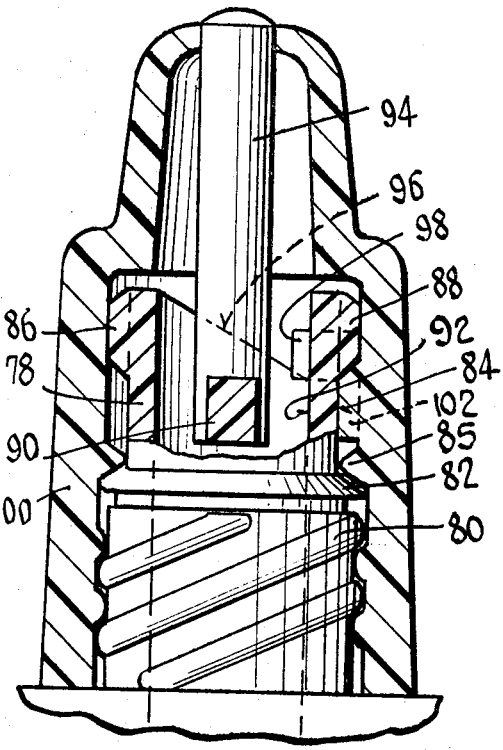
FIG. 6 is a view partly in axial section and partly in side elevation, of a cap construction constituting yet another embodiment of the invention.
Figure 7:
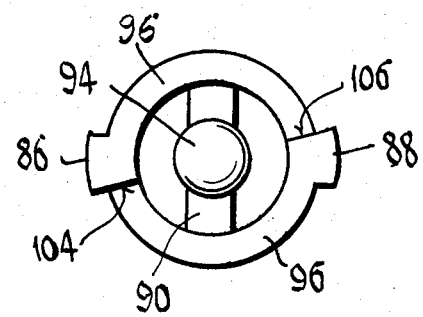
FIG. 7 is a top plan view of the tubular body part of the cap construction.

Yet another embodiment of the invention is illustrated in FIGS. 6 and 7. In these figures, a tubular body 78 has outside screw threads 80, an annular sealing bead 82 and a cylindrical sealing surface 84 disposed above the bead 82. The top portion of the body 78 has a pair of vertically extending stop lugs 86, 88 which are indirectly reinforced by radial ribs 90 located in the bore 92 of the body and disposed at 90° with respect to the lugs 86, 88. The ribs 90 carry a closure pin 94 which extends upward from the tubular body 78 along the axis thereof. The body 78 has a pair of sloping or camming top edges 96 which are engageable with lugs 98 disposed inside the screw cap 100. The camming surfaces or edges 96 have the same pitch as the screw threads 80 and supplement the action of the latter in effecting a positive axial raising movement of the screw cap 100 when it is turned in a counterclockwise, unscrewing direction. The bridge constituted of the ribs 90 and the closure pin 94 reinforces the cylindrical wall of the body 78 and tends to maintain the same in a cylindrical shape, whereby the stop lugs 86, 88 are held in their normal, undisturbed positions shown. Cooperable with the stop lugs 86, 88 are stop lugs 102 disposed inside the screw cap 100, said lugs halting both the unscrewing movement of the screw cap when it has attained the raised, dispensing position and the screwing down of the cap in the sealing position. With the construction shown, the stop lugs 86, 88 present substantial surfaces for engagement by the lugs 102, effecting a very reliable limitation on the unscrewing movement of the cap.

It will be noted that the camming lugs 98 of the screw cap 100 are engageable with side surfaces 104, 106 of the stop lugs 86, 88 whereby a positive halting of the screw cap is effected when it is screwed down to the sealing position. During removal of the tubular body 78 from the molds, there is sufficient yieldability of the cylindrical wall to permit stripping from the die cavity even though the lugs 86, 88 represent undercuts in the cavity. However, such yieldability of the stop lugs 86, 88 is definitely restricted by the ribs 90 and surrounding cylindrical wall portions of the body 78 so that a distinct reinforcement of the stop lugs is had to reliably halt the unscrewing of the cap 100.

Engageable with the cylindrical sealing surface 84 is an internal annular sealing bead 85 provided on the interior of the screw cap 100.

It will now be seen from the foregoing that I have provided novel and improved dispensing screw cap constructions wherein effective stop or movement-limiting means are provided on the uppermost portions of the tubular cap body, comprising stop lugs which are reinforced by interior rib or bridge structures located in the bore of the tubular body. An effective functioning of the screw cap construction is accordingly attained while at the same time dimensions are held to small values. The organization is compact, and the various parts may be easily and economically molded of plastic substance. In the case of the embodiment of FIGS. 6 and 7, the stops which limit the upward unscrewing movement also function to limit the downward or screwing, sealing movement of the screw cap.

Variations and modifications may be made within the scope of the claims, and portions of the improvement may be used without others.

I claim:
1. A dispensing closure cap comprising, in combination:
   (a) an upright tubular molded plastic, yieldable body adapted to be carried on a container, the bore of said body constituting a discharge passage for product to be dispensed from the container,
   (b) said body having a closure pin disposed at the end of said discharge passage and extending upward from the center of the upper end of the body,
   (c) a molded plastic screw cap axially movable on said body and surrounding the same,
   (d) cooperable thread means on the tubular body and screw cap for effecting axial movement of the latter in response to its being turned,
   (e) said cap having an orifice in its top, adapted to be closed by the closure pin when the cap is screwed down on the tubular body, wherein the improvement comprises:
   (f) a stop lug disposed on the outer surface of the upper end of the tubular body,
   (g) said cap having on its inside a cooperable stop lug which is engageable with the lug of the tubular body when the screw cap is raised, thereby to limit the unscrewing turning movement of the cap, and
   (h) reinforcement means for said upper end of the tubular body, tending to stiffen the stop lug thereof, and
   (i) cooperable sealing means disposed on said body and cap, located at a level below the stop lug on the body, for preventing the dispensed substance from contacting said cooperable threads.
2. A cap as in claim 1, wherein:
   (a) the reinforcement means comprises a rib extending transversely across the discharge passage of the tubular body.
3. A cap as in claim 2, wherein:
   (a) the rib joins the top of the tubular body at a point adjoining the stop lug thereof.
4. A cap as in claim 2, wherein:
   (a) the rib engages the inside of the tubular body at a point removed from the stop lug thereof,
   (b) said rib tending to prevent diametric spreading of the body in right-angled directions.
5. A cap as in claim 2, wherein:
   (a) the transverse rib carries said closure pin.
6. A dispensing closure cap comprising, in combination:
   (a) an upright tubular molded plastic, yieldable body adapted to be carried on a container, the bore of said body constituting a discharge passage for product to be dispensed from the container,
   (b) said body having a closure pin disposed at the end of said discharge passage and extending upward from the center of the upper end of the body,
   (c) a molded plastic screw cap axially movable on said body and surrounding the same,
   (d) cooperable thread means on the tubular body and screw cap for effecting axial movement of the latter in response to its being turned,
   (e) said cap having an orifice in its top, adapted to be closed by the closure pin when the cap is screwed down on the tubular body, wherein the improvement comprises:
   (f) a stop lug disposed on the outer surface of the upper end of the tubular body,
   (g) said cap having on its inside a cooperable stop lug which is engageable with the lug of the tubular body when the screw cap is raised, thereby to limit the unscrewing turning movement of the cap, and
   (h) reinforcement means for said upper end of the tubular body, tending to stiffen the stop lug thereof,
   (i) said reinforcement means comprising a rib extending transversely across the discharge passage of the tubular body,
   (j) the interior of the screw cap comprising a cylindrical sealing surface,
   (k) said thread means comprising a screw thread carried by the tubular body and engaged with the sealing surface thereof,
   (l) said body having a bead on its outer surface, connecting adjoining convolutions of the screw thread to prevent viscous product from getting between said convolutions.
7. A cap as in claim 2, wherein:
   (a) a second stop lug is provided on the tubular body at a location diametrically opposite the first mentioned stop lug,
   (b) said screw cap having a second stop lug cooperable with the second lug of the tubular body.
8. A cap as in claim 7 wherein:
   (a) the stop lugs of the tubular body are located at the ends of the transverse reinforcement rib thereof.
9. A cap as in claim 7, wherein:
   (a) the stop lugs of the tubular body are located 90° from the ends of the reinforcement rib thereof.
10. A cap as in claim 7, wherein:
    (a) the stop lugs of the tubular body are elongate and extend axially thereof.

References Cited

UNITED STATES PATENTS

| 1,986,061 | 1/1935 | Hill | 222—521 X |
| 2,542,350 | 2/1951 | Paulsen | 222—521 X |
| 2,582,224 | 1/1952 | Boadway | 222—521 |
| 2,619,265 | 11/1952 | Jacobsohn | 222—521 |
| 2,769,582 | 11/1956 | Schlicksupp | 222—521 X |
| 2,844,289 | 7/1958 | Ogren | 222—499 |
| 3,216,630 | 11/1965 | Stull | 222—521 X |
| 3,240,404 | 3/1966 | Porter et al. | 222—521 |

SAMUEL F. COLEMAN, *Primary Examiner.*